US010415947B2

(12) United States Patent
Arai et al.

(10) Patent No.: US 10,415,947 B2
(45) Date of Patent: Sep. 17, 2019

(54) MEASUREMENT PROBE AND MEASURING DEVICE

(71) Applicant: MITUTOYO CORPORATION, Kanagawa (JP)

(72) Inventors: Hideyuki Arai, Tokyo (JP); Kazuya Iwasaki, Kanagawa (JP); Minoru Tanaka, Tochigi (JP); Shuichi Kamiyama, Kanagawa (JP); Kazuhiko Hidaka, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 237 days.

(21) Appl. No.: 15/647,446

(22) Filed: Jul. 12, 2017

(65) Prior Publication Data

US 2018/0023936 A1    Jan. 25, 2018

(30) Foreign Application Priority Data

Jul. 19, 2016    (JP) ................................. 2016-141320

(51) Int. Cl.
| *G01B 5/016* | (2006.01) |
| *G01B 5/00*  | (2006.01) |
| *G01B 5/02*  | (2006.01) |
| *G01B 5/12*  | (2006.01) |
| *G01B 5/14*  | (2006.01) |

(52) U.S. Cl.
CPC .......... *G01B 5/016* (2013.01); *G01B 5/0007* (2013.01); *G01B 5/02* (2013.01); *G01B 5/12* (2013.01); *G01B 5/143* (2013.01)

(58) Field of Classification Search
CPC ...... G01B 5/012; G01B 11/007; G01B 3/008; G01B 5/20; G01B 11/002; G01B 11/2441; G01B 5/008; G01B 5/016
USPC ........................................... 33/503
See application file for complete search history.

(56) References Cited

U.S. PATENT DOCUMENTS

| 5,048,194 A | 9/1991 | McMurtry |
| 9,528,824 B2 | 12/2016 | Bos et al. |
| 2003/0030807 A1* | 2/2003 | Takahashi ................ G01B 5/20 356/399 |
| 2004/0128847 A1* | 7/2004 | Fracheboud ........... G01B 5/012 33/558 |

(Continued)

FOREIGN PATENT DOCUMENTS

JP    H02-502488 A    8/1990

*Primary Examiner* — Yaritza Guadalupe-McCall
(74) *Attorney, Agent, or Firm* — Greenblum & Bernstein, P.L.C.

(57) ABSTRACT

A probe includes a movable plate to which a stylus capable of contacting a measurable object is mounted, the movable plate displaceable in an X direction; a static plate arranged to overlap with the movable plate; a counter plate facing the movable plate and the static plate; an elastic movable side connection plate, the movable side connection plate connecting the counter plate at at least three places with each of a first end connector positioned toward a first end of the movable plate in the X direction and second end connectors positioned toward a second end in the X direction; and a static side connection plate which connects the static plate and the counter plate. An entire length of the first end connector in a Y direction orthogonal to the X direction is the same size as the entire length of the second end connectors in the Y direction.

9 Claims, 11 Drawing Sheets

(56) References Cited

U.S. PATENT DOCUMENTS

2004/0154179 A1* 8/2004 Rouge .................... G01B 5/012
                                                        33/561
2016/0299028 A1   10/2016 Arai et al.
2018/0023936 A1*  1/2018 Arai ..................... G01B 5/0007
                                                        33/503

* cited by examiner

MEASUREMENT PROBE AND MEASURING DEVICE

CROSS-REFERENCE TO RELATED APPLICATIONS

The present application claims priority under 35 U.S.C. § 119 of Japanese Application No. 2016-141320, filed on Jul. 19, 2016, the disclosure of which is expressly incorporated by reference herein in its entirety.

BACKGROUND OF THE INVENTION

1. Field of the Invention

The present invention relates to a measurement probe and measuring device.

2. Description of Related Art

Measuring devices such as a coordinate measuring device include a measurement probe which performs measurement by contacting a measurable object. The measurement probe is detachably mounted to a spindle of the measuring device and includes a stylus which contacts the measurable object.

A measurement probe described in Japanese Unexamined Patent Publication No. H02-502488 below is configured in a parallelogram with three springs such that the stylus can translate in X, Y, and Z directions. The parallelogram with springs is configured with an inner plate, an outer plate, a middle plate, a plate spring and the like. The stylus is mounted to the inner plate and can translate with the inner plate.

In the configuration described in Japanese Unexamined Patent Publication No. H02-502488 above, when the stylus contacts the measurable object, an external force may apply to the inner plate to which the stylus is mounted, the external force being applied in a direction orthogonal to a direction where the inner plate translates, for example. In such cases, the inner plate receives a torsional force and attempts to rotate. At this point, unintended deformation is caused due to insufficient rigidity of the inner plate and a mounting position of the stylus is greatly displaced. Because of the displacement of the mounting position of the stylus, a measurement error occurs.

SUMMARY OF THE INVENTION

The present invention has been devised in consideration of the circumstances above, and suppresses displacement of a stylus which is caused by a plate to which the stylus is mounted receiving a torsional force.

In one aspect according to the present invention, a measurement probe performs measurement by contacting a measurable object and includes a movable plate to which is mounted a stylus capable of contacting the measurable object, the movable plate being capable of displacing in a first direction; a static plate arranged so as to overlap with the movable plate; a counter plate facing the movable plate and the static plate; a movable side connection plate having elasticity, the movable side connection plate connecting the counter plate at at least three places with each of a first end connector positioned toward a first end of the movable plate in the first direction and a second end connector positioned toward a second end in the first direction; and a static side connection plate which connects the static plate and the counter plate. An entire length of the first end connector in a second direction which is orthogonal to the first direction is the same size as the entire length of the second end connector in the second direction.

In addition, a shape of the first end of the movable plate in the first direction and the shape of the second end of the movable plate in the first direction may be asymmetrical to each other.

Further, a distance of the second end connector from a mounting position where the stylus is mounted may be larger than the distance of the first end connector from the mounting position.

Furthermore, the movable side connection plate and the static side connection plate may be formed by a single plate member in which a portion of the counter plate side of the movable side connection plate and a portion of the counter plate side of the static side connection plate are connected.

In addition, the movable plate, the static plate, the counter plate, the movable side connection plate, and the static side connection plate are a first movable plate, a first static plate, a first counter plate, a first movable side connection plate, and a first static side connection plate respectively. The measurement probe may further include a second movable plate which is coupled to the first static plate via a coupler and is capable of displacing in the second direction orthogonal to the first direction; a second static plate arranged so as to overlap with the second movable plate; a second counter plate facing the second movable plate and the second static plate; a second movable side connection plate having elasticity, the second movable side connection plate connecting the second counter plate at at least three places with each of a first end connector positioned toward a first end of the second movable plate in the second direction and a second end connector positioned toward a second end in the second direction; and a second static side connection plate connecting the second static plate and the second counter plate. The entire length of the first end connector of the second movable side connection plate in the first direction may be the same size as the entire length of the second end connector of the second movable side connection plate in the first direction.

In addition, the second movable plate may be positioned above the first counter plate and the first counter plate may include an opening forming a through-hole through which the columnar coupler passes.

Further, the second movable plate, the second static plate, the second counter plate, the second movable side connection plate, and the second static side connection plate may be positioned in a space between the first static plate and the first counter plate.

Furthermore, the coupler may be a portion extending in the second direction from the second movable plate.

In another aspect according to the present invention, a measuring device includes a measurement probe performing measurement by contacting a measurable object and a mounting portion where the measurement probe is mounted. The measurement probe includes a movable plate to which is mounted a stylus capable of contacting the measurable object, the movable plate being capable of displacing in a first direction; a static plate arranged so as to overlap with the movable plate; a counter plate facing the movable plate and the static plate; a movable side connection plate having elasticity, the movable side connection plate connecting the counter plate at at least three places with each of a first end connector positioned toward a first end of the movable plate in the first direction and a second end connector positioned toward a second end in the first direction; and a static side connection plate connecting the static plate and the counter plate. An entire length of the first end connector in a second direction which is orthogonal to the first direction is the same size as the entire length of the second end connector in the second direction.

According to the present invention, the displacement of the stylus caused by the plate to which the stylus is mounted receiving the torsional force can be suppressed.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

First Embodiment

Configuration of Coordinate Measuring Device

Figure 1:
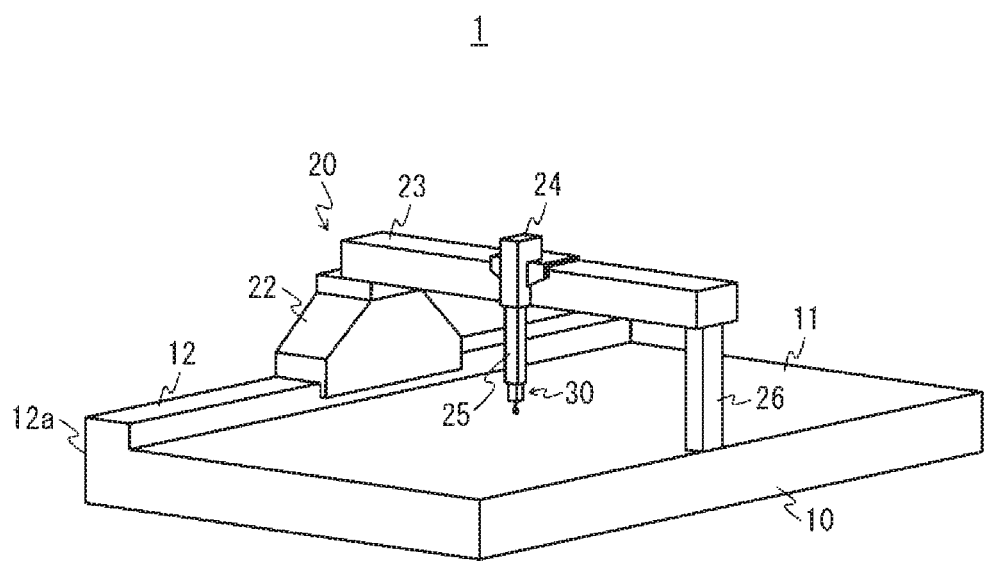
FIG. 1 is a perspective view illustrating an exemplary outward configuration of a coordinate measuring device 1 according to a first embodiment of the present invention.
Figure 1:
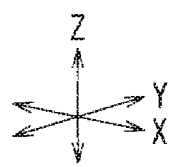

With reference to FIG. 1, a configuration of a coordinate measuring device 1, which is exemplary of a measuring device according to a first embodiment of the present invention, is described.

FIG. 1 is a perspective view illustrating an exemplary outward configuration of the coordinate measuring device 1 according to the first embodiment. As shown in FIG. 1, the coordinate measuring device 1 includes a base 10, a displacement mechanism 20, and a probe 30.

The base 10 is formed in a rectangular plate shape as shown in FIG. 1. The base 10 includes a placement surface 11 where a work piece (measurable object) is placed. In addition, a guide 12 is provided on the placement surface 11 along a Y-axis direction toward a first end of the base 10 in an X-axis direction. The guide 12 guides displacement of the displacement mechanism 20 (specifically, a column 22 of the displacement mechanism 20) in the Y-axis direction.

The displacement mechanism 20 displaces the probe 30 which is mounted to a forefront end of a ram 25 in the X-axis, Y-axis, and Z-axis directions. The displacement mechanism 20 includes the column 22, a beam 23, a slider 24, and the ram 25. In addition, the displacement mechanism 20 includes a driver (not shown in the drawings) to displace the column 22, the slider 24, and the ram 25.

The column 22 stands upright on the guide 12. The column 22 can be displaced on the guide 12 along the Y-axis direction. The beam 23 is provided extending in the X-axis direction. A first end of the beam 23 in a length direction is supported by the column 22 and a second end of the beam 23 in the length direction is supported by a support 26. The beam 23 displaces with the column 22 in the Y-axis direction.

The slider 24 is supported by the beam 23 and is formed in a cylindrical shape along the Z-axis direction. The slider 24 can be displaced on, the beam 23 along the X-axis direction. The ram 25 is inserted inside the slider 24 and displaces with the slider 24 in the X-axis direction. In addition, the ram 25 can be displaced inside the slider 24 along the Z-axis direction.

The probe 30 is a measurement probe which performs measurement of coordinates and the like of the work piece by contacting the work piece on the base 10. The probe 30 is mounted to a lower portion of the ram 25 (attachment portion). In addition, a stylus is provided to the forefront end of the probe 30, the stylus being capable of contacting the work piece on the base 10.

Internal Configuration of Probe 30

Figure 2:
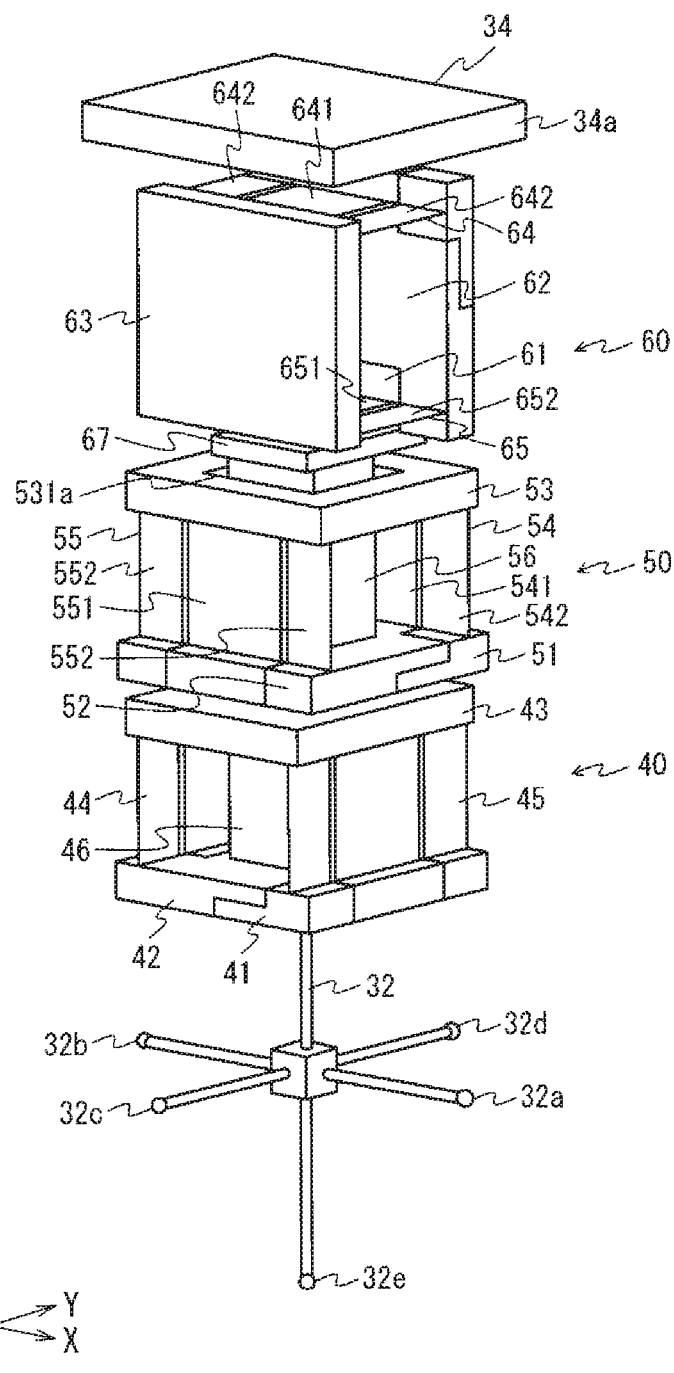
FIG. 2 is a perspective view illustrating an internal configuration of a probe 30.
Figure 3:
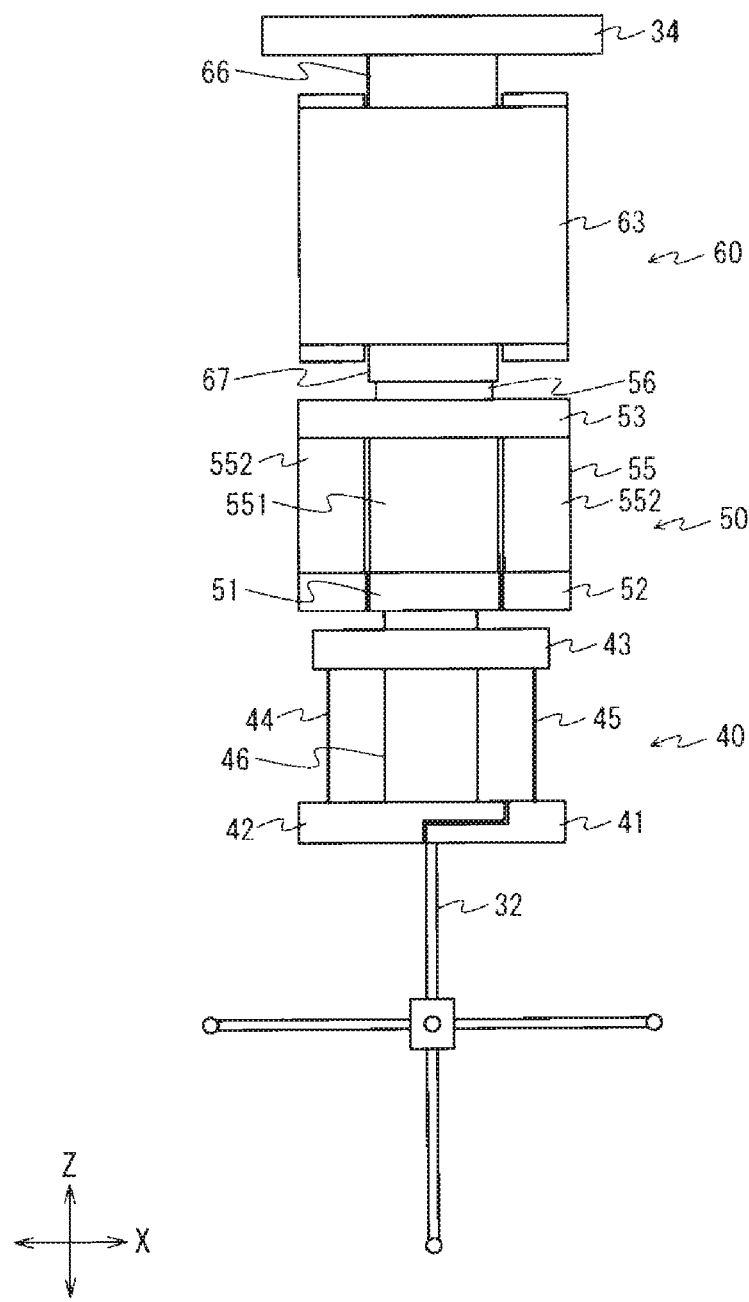
FIG. 3 views the probe 30 shown in FIG. 2 from a Y-axis direction.
Figure 4:
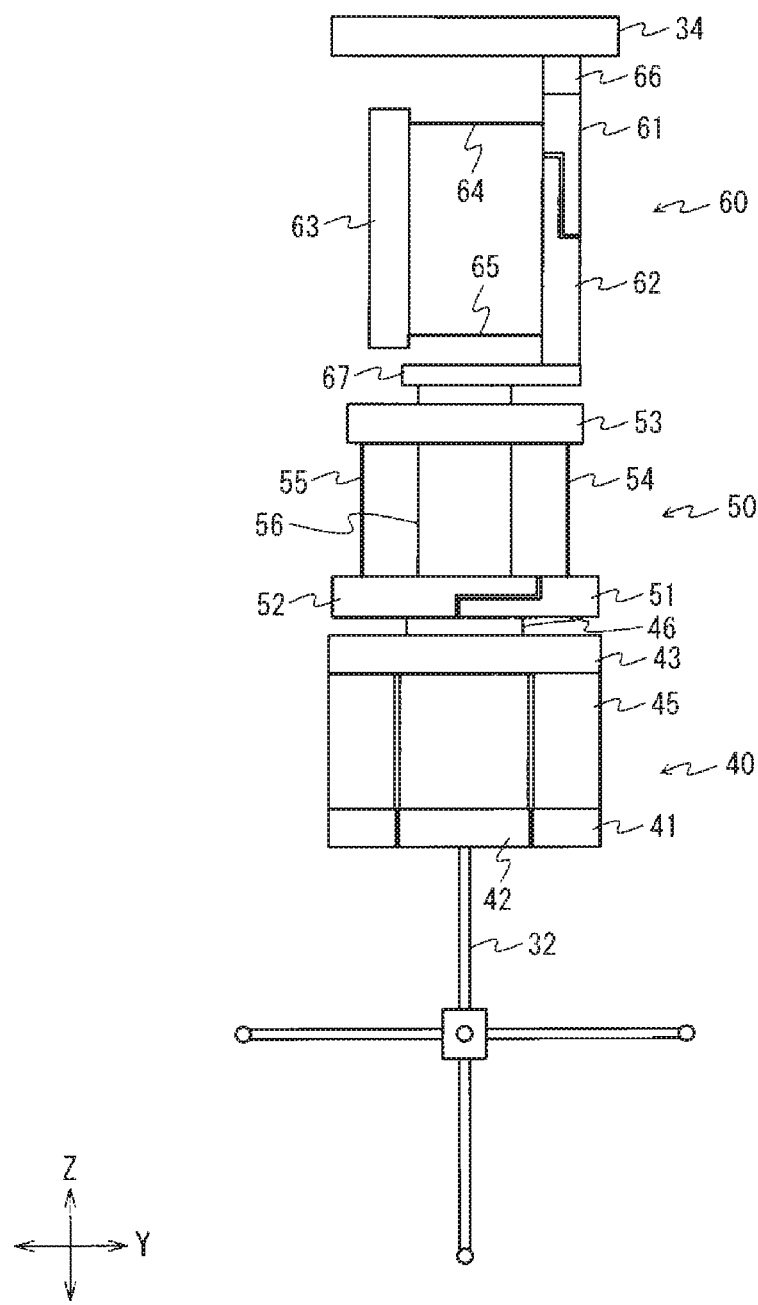
FIG. 4 views the probe 30 shown in FIG. 2 from an X-axis direction.

With reference to FIGS. 2 to 4, an internal configuration of the probe 30 is described. FIG. 2 is a perspective view illustrating the internal configuration of the probe 30. FIG. 3 views the probe 30 shown in FIG. 2 from the Y-axis direction. FIG. 4 views the probe 30 shown in FIG. 2 from the X-axis direction.

As shown in FIGS. 2 to 4, the probe 30 includes a stylus 32, a housing 34, the X direction movable structure 40, a Y direction movable structure 50, and a Z direction movable structure 60.

The stylus 32 performs measurement by contacting the work piece on the base 10. As shown in FIG. 2, the stylus 32 has contacts 32a to 32e each extending in different directions. Further, the shape of the stylus 32 is not limited to the shape in FIG. 2.

The housing 34 forms a casing of the probe 30. In FIG. 2, in order to describe the internal configuration of the probe 30, only an upper wall 34a of the housing 34 is depicted, while side walls and the like are omitted. The housing 34 is formed in a cylindrical shape so as to cover the X direction movable structure 40, the Y direction movable structure 50, and the Z direction movable structure 60.

The X direction movable structure 40 receives an external force to be movable in the X-axis direction. The stylus 32 is fixated to the X direction movable structure 40. When an external force occurs to displace the stylus 32 in the X-axis direction due to the stylus 32 contacting the work piece and the like, the X direction movable structure 40 is movable in the X-axis direction to absorb the displacement of the stylus 32 caused by the external force. The detailed configuration of the X direction movable structure 40 is described later.

The Y direction movable structure 50 receives the external force to be movable in the Y-axis direction. The Y direction movable structure 50 is positioned above the X direction movable structure 40 and is coupled to the X direction movable structure 40. When the external force occurs to displace the stylus 32 in the Y-axis direction due to the stylus 32 contacting the work piece and the like, the Y direction movable structure 50 is movable in the Y-axis direction to absorb the displacement of the stylus 32 caused by the external force. The detailed configuration of the Y direction movable structure 50 is described later.

The Z direction movable structure 60 receives the external force to be movable in the Z-axis direction. The Z direction movable structure 60 is positioned above the Y direction movable structure 50 and is coupled to the Y direction movable structure 50. In addition, the Z direction movable structure 60 is coupled to the upper wall 34*a* of the housing 34. When the external force occurs to displace the stylus 32 in the Z-axis direction due to the stylus 32 contacting the work piece and the like, the Z direction movable structure 60 is movable in the Z-axis direction to absorb the displacement of the stylus 32 caused by the external force. The detailed configuration of the Z direction movable structure 60 is described later.

Detailed Configuration of X Direction Movable Structure 40

Figure 5:
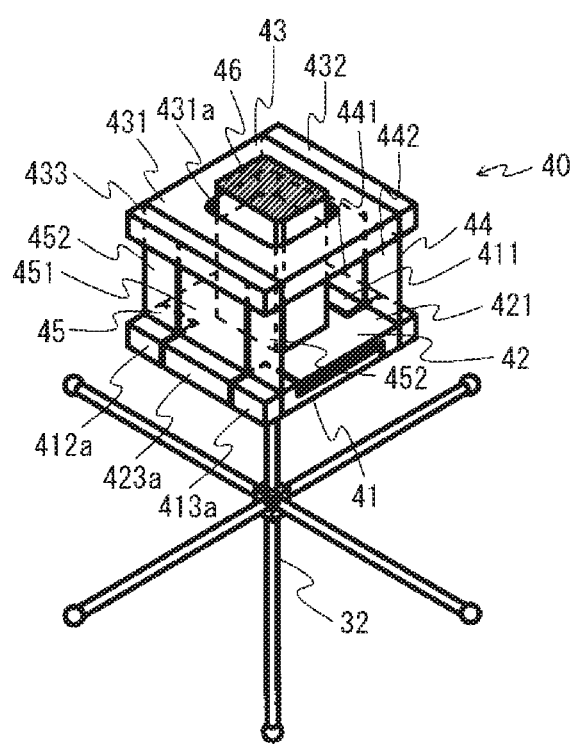
FIG. 5 is a perspective view illustrating a configuration of an X direction movable structure 40.
Figure 5:
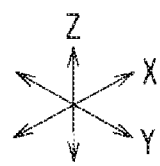
Figure 6:
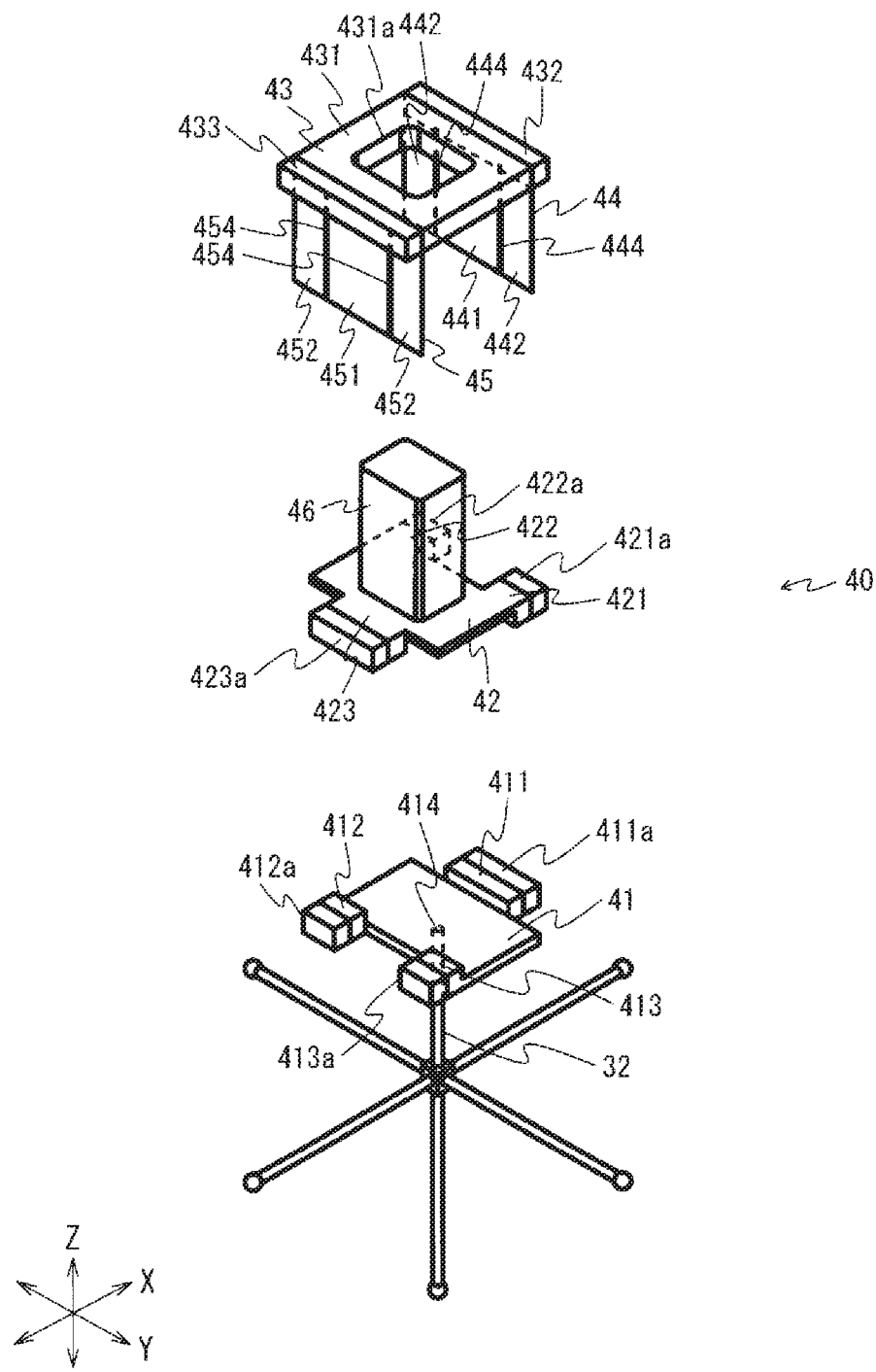
FIG. 6 is an exploded perspective view of the X direction movable structure 40 shown in FIG. 5.

With reference to FIGS. 5 and 6, the detailed configuration of the X direction movable structure 40 is described.

FIG. 5 is a perspective view illustrating a configuration of the X direction movable structure 40. FIG. 6 is an exploded perspective view of the X direction movable structure 40 in FIG. 5. As shown in FIG. 6, the X direction movable structure 40 includes a movable plate 41, a static plate 42, a counter plate 43, a pair of connection plates 44 and 45, and a coupler 46.

The movable plate 41 is positioned at a bottom portion of the X direction movable structure 40. As shown in FIG. 6, the stylus 32 is mounted to the movable plate 41 at a mounting position. The movable plate 41 is formed by a single metal member and has a rectangular thin plate shape.

As shown in FIG. 6, the movable plate 41 is formed such that a shape of a first end and the shape of a second end in the X-axis direction (movable direction) are mutually asymmetrical. Specifically, the movable plate 41 includes a first end extension portion 411 provided to the first end in the X-axis direction and second end extension portions 412 and 413 provided to the second end in the X-axis direction. The first end extension portion 411 and the second end extension portions 412 and 413 are provided at different positions in the Y-axis direction. Specifically, the first end extension portion 411 is formed at a center portion of the first end side of the movable plate 41 so as to project from the first end along the X-axis direction. In addition, the second end extension portions 412 and 413 are formed at both ends of the second end of the movable plate 41 so as to project from the second end along the X-axis direction. In other words, the movable plate 41 is formed so as to be substantially Y-shaped when viewed from the Z-axis direction.

The first end extension portion 411 and the second end extension portions 412 and 413 are configured such that bottom surfaces thereof are level with the bottom surface of the movable plate 41 and upper surfaces thereof project beyond a top surface of the movable plate 41. In other words, the first end extension portion 411 and the second end extension portions 412 and 413 are provided in a state projecting on the top surface with respect to the movable plate 41. In addition, when viewed from the Z-axis direction, a width of the first end extension portion 411 in the Y-axis direction (size of a width $2a$ in FIG. 7 which is described later) is twice as large as a width of the second end extension portions 412 and 413 (size of a width $a$ in FIG. 7). In other words, an entire length (length $2a$) of the first end extension portion 411 in the Y-axis direction is the same size as the entire length (length $2a$) of the second end extension portions 412 and 413 in the Y-axis direction.

The first end extension portion 411 holds the connection plate 44 with an opposing holder 411*a*. The holder 411*a* is fixated with a fastening member and the like to a side surface of the first end extension portion 411 in a state holing the connection plate 44. In addition, the second end extension portions 412 and 413 hold the connection plate 45 with opposing holders 412*a* and 413*a* respectively. The holders 412*a* and 413*a* are fixated with the fastening member and the like to the side surface of the second end extension portions 412 and 413 respectively in a state holding the connection plate 45.

The stylus 32 is mounted to a mounting position 414 which is positioned in a center of the movable plate 41. The movable plate 41 is movable in the X-axis direction when the external force is applied to displace the stylus 32 in the X-axis direction. Further, in the present embodiment (described in detail later), a center of rotation when the movable plate 41 rotates after receiving the external force in the direction (Y-axis direction in this example) orthogonal to the movable direction (X-axis direction) of the movable plate 41 is positioned in the center of the movable plate 41. Accordingly, the mounting position 414 of the stylus 32 and the center of rotation of the movable plate 41 are positioned close to each other. Therefore, even when the movable plate 41 rotates, the displacement of the stylus 32 can be suppressed.

Figure 7:
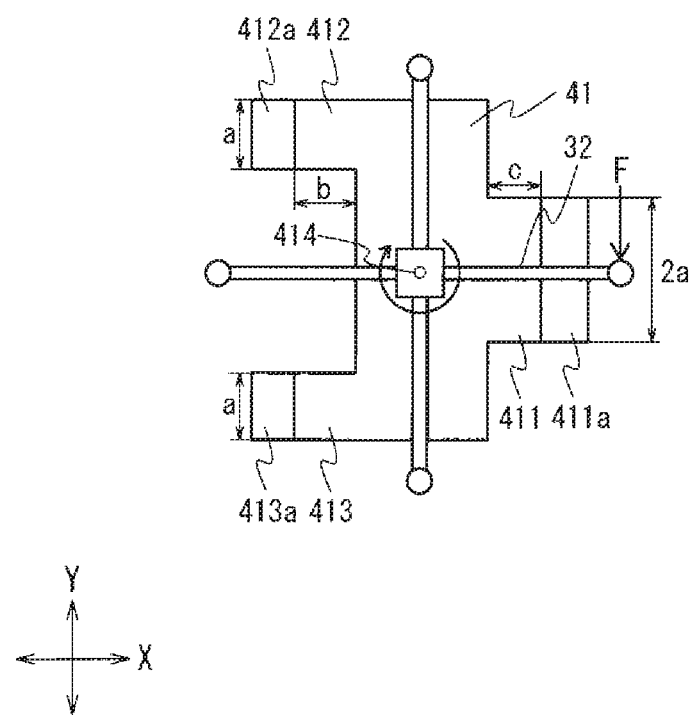
FIG. 7 is a schematic view illustrating a rotation state of a movable plate 41 when an external force is applied.

FIG. 7 is a schematic view illustrating a rotation state of the movable plate 41 when the external force is applied. In this example, an external force F along the Y-axis direction is applied to the stylus 32 during measurement. When the external force F shown in FIG. 7 is applied, a torsional force attempting to rotate the stylus 32 occurs. Due to this torsional force, the movable plate 41 to which the stylus 32 is mounted also rotates. In such a case, when the movable plate 41 has a rectangular shape (in other words, there are only two places connecting with the connection plate (plate spring)), unlike in the present embodiment, unintended deformation is caused due to insufficient rigidity of the movable plate 41 with respect to the external force F. As a result, the center of rotation of the movable plate 41 may be in a position offset from the movable plate 41 and as the movable plate 41 rotates, the position of the stylus 32 may be greatly displaced.

In contrast, in the present embodiment, unlike the movable plate according to a comparative example described above, there are three places connecting with the connection plates 44 and 45 of the movable plate 41, and the entire length of the first end extension portion 411 (length $2a$) in the Y-axis direction is the same as the entire length of the second end extension portions 412 and 413 (length 2a) in the Y-axis direction. Therefore, the center of rotation when the movable plate 41 is rotated by the external force F is positioned in the center of the movable plate 41. In addition, as described above, the mounting position 414 of the stylus 32 is positioned in the center of the movable plate 41. The mounting position 414 of the stylus 32 may also be positioned in the X-axis direction and the Y-axis direction as described below, for example. Specifically, the mounting position 414 is positioned where a distance between the mounting position 414 and the first end extension portion 411, and the distance between the mounting position 414 and the second end extension portion 412 (413) are the same in the X-axis direction. In addition, the mounting position 414 is positioned where the distance between the mounting position 414 and second end extension portion 412, and the distance between the mounting position 414 and the second end extension portion 413 are the same in the Y-axis direction. Accordingly, even when the movable plate 41 rotates centered on the center of rotation when the external force F is applied to the stylus 32, mounting position 414 is difficult to displace, and therefore, the displacement of the stylus 32 can be suppressed. As a result, a measurement error due to the displacement of the stylus 32 can be prevented from occurring.

Further, in the present embodiment, the movable plate 41 is Y-shaped and the second end extension portions 412 and 413, when viewed from the mounting position 414, are positioned farther from the first end extension portion 411. When the distance between the second end extension portions 412 and 413 and the mounting position 414 of the stylus 32 is increased in this way, when the torsional force occurs due to the external force F, the rigidity (torsional rigidity) of the connection plate 44, which is connected with the second end extension portions 412 and 413, with respect to the torsional force is enhanced. This is because the torsional rigidity is proportional to the square of the distance. Further, in the present embodiment, as shown in FIG. 7, a length (width c) of the first end extension portion 411 in the X-axis direction is the same size as the length (width b) of the second end extension portions 412 and 413 in the X-axis direction, and has a size that does not decrease the rigidity.

Further, the movable plate 41 is Y-shaped in the description above, however, the shape is not limited to this. For example, the shape of the movable plate 41 may be a W-shape and specifically, the movable plate 41 may have two of the first end extension portion and three of the second end extension portion. In addition, the movable plate 41 may have three of the first end extension portion and four of the second end extension portion. Furthermore, the movable plate 41 may have a single first end extension portion and three of the second end extension portion.

Returning to FIGS. 5 and 6, the configuration of the X direction movable structure 40 is described. The static plate 42 is formed by a single metal member similar to the movable plate 41 and is arranged so as to overlap with the movable plate 41 from above, as shown in FIG. 5, in a state having gaps with a predetermined size in the X-axis, Y-axis and Z-axis directions. By providing such gaps, when the movable plate 41 is displaced in the X-axis direction (movable direction), the movable plate 41 can be inhibited from contacting and rubbing against the static plate 42.

In addition, the static plate 42 and the movable plate 41 are arranged so as to hold each other. The static plate 42 is coupled to the Y direction movable structure 50 by the coupler 46 which is described later.

The static plate 42 includes first end extension portions 421 and 422 provided toward a first end in the X-axis direction and a second end extension portion 423 provided toward a second end in the X-axis direction. The first end extension portions 421 and 422 are formed at both ends toward the first end of the static plate 42 so as to project from the first end along the X-axis direction. In addition, the second end extension portion 423 is formed at the center toward the second end of the static plate 42 so as to project from the second end along the X-axis direction. When the static plate 42 is arranged so as to overlap with the movable plate 41 from above, the top surfaces of the first end extension portions 421 and 422 and the second end extension portion 423 are configured to be coplanar with the top surfaces of the first end extension portion 411 and the second end extension portions 412 and 413.

The first end extension portions 421 and 422 hold the connection plate 44 with opposing holders 421a and 422a. The opposing holders 421a and 422a are fixated with the fastening member and the like to the side surfaces of the first end extension portions 421 and 422 respectively in a state holding the connection plate 44. In addition, the second end extension portion 423 holds the connection plate 45 with an opposing holder 423a. The holder 423a is fixated with the fastening member and the like to the side surface of the second end extension portion 423 in a state holding the connection plate 45.

As shown in FIG. 5, the counter plate 43 is positioned on a top portion of the X direction movable structure 40. The counter plate 43 is facing the movable plate 41 and the static plate 42 in a state separated from the movable plate 41 and the static plate 42. The connection plates 44 and 45 are arranged between the counter plate 43, and the movable plate 41 and the static plate 42, and main surfaces of the connection plates 44 and 45 are positioned along the Z-axis direction.

The counter plate 43 includes holders 432 and 433 between side surfaces of a base portion 431 of the counter plate 43 to hold the connection plates 44 and 45. The holders 432 and 433 are fixated to the side surface of the base portion 431 with the fastening member, for example. Further, an opening 431a forming a rectangular through-hole is provided at a center side of the base portion 431 of the counter plate 43. By providing the opening 431a, the counter plate 43 can be reduced in weight.

As shown in FIG. 6, a pair of the connection plates 44 and 45 are arranged separated from each other in the X-axis direction (movable direction of the movable plate 41). The connection plate 44 is positioned toward the first end in the X-axis direction and the connection plate 45 is positioned toward the second end in the X-axis direction. In addition, the connection plates 44 and 45 are arranged so as to be orthogonal to the movable plate 41. The connection plates 44 and 45 are formed by a thin sheet metal member and have elasticity.

The connection plate 44 includes a center side connector 441 and a pair of end side connectors 442. In the connection plate 44, the center side connector 441 corresponds to the movable side connection plate and the end side connectors 442 correspond to the static side connection plate.

The center side connector 441 is positioned toward the center side in the X-axis direction. The center side connector 441 connects the first end extension portion 441 of the movable plate 41 to the counter plate 43. The pair of end side connectors 442 are positioned on both ends of the center side connector 441. The pair of end side connectors 442 connect the respective first end extension portions 421 and 422 of the static plate 42 to the counter plate 43. As shown in FIG. 6, a slit 444 is formed along the Z-axis direction between each of the center side connector 441 and the end side connectors 442.

The connection plate 45 includes a center side connector 451 and a pair of end side connectors 452. In the connection plate 45, unlike in the connection plate 44, the center side connector 451 corresponds to the static side connection plate and the end side connectors 452 correspond to the movable side connection plate.

The center side connector 451 connects the second end extension portion 423 of the static plate 42 to the counter plate 43. The pair of end side connectors 452 connect the respective second end extension portions 412 and 413 of the movable plate 41 to the counter plate 43. A slit 454 is formed along the Z-axis direction between each of the center side connector 451 and the end side connectors 452.

In the configuration of the connection plates 44 and 45 mentioned above, by bending the center side connector 441 of the connection plate 44 and the end side connectors 452 of the connection plate 45 where the first ends thereof are connected to the movable plate 41, the movable plate 41 is movable in the X-axis direction. At this point, although a portion of the counter plate 43 is connected to the movable plate 41 via the center side connector 441 and the end side connector 452, the counter plate 43 is also connected to the static plate 42 via the end side connectors 442 and the center side connector 451. Therefore, the counter plate 43 is not displaced in the X-axis direction. In addition, the center side connector 441 and the end side connectors 442 are formed in a single connection plate 44, and therefore, a number of components can be reduced.

Further, by connecting the connection plate 44 to the movable plate 41, the static plate 42, and the counter plate 43, compared to a case where the center side connector 441 and the end side connectors 442 are individually connected to the movable plate 41, the static plate 42, and the counter plate 43, correcting parallelism when the center side connector 441 and the end side connectors 442 are connected to the movable plate 41, the static plate 42, and the counter plate 43 is readily performed and assembly accuracy is improved.

The coupler 46 couples the X direction movable structure 40 and the Y direction movable structure 50 (see FIG. 4). The coupler 46 is arranged in a space between the static plate 42 and the counter plate 43. Accordingly, the coupler 46 can be arranged effectively utilizing dead space between the static plate 42 and the counter plate 43.

The coupler 46 is formed in a prismatic shape and a first end of the coupler 46 in a length direction is coupled to the center of the static plate 42. In addition, as shown in FIG. 3, a second end of the coupler 46 in the length direction is coupled to the Y direction movable structure 50. The second end of the coupler 46 in the length direction is inserted through the through-hole of the opening 431a of the counter plate 43. Of the movable plate 41 and the static plate 42, the coupler 46 is coupled to the static plate 42. Therefore, even when the coupler 46 is movable in the X-axis direction of the movable plate 41, there is no influence on the Y direction movable structure 50.

In the above, the connection plate 44 includes the center side connector 441 and the end side connectors 442, however, the present invention is not limited to this. For example, the center side connector 441 and the end side connectors 442 may be mutually independent components.

Similarly, the center side connector 451 and the end side connectors 452 of the connection plate 45 may be mutually independent components.

Detailed Configuration of Y Direction Movable Structure 50

With reference to FIGS. 2 to 4, the detailed configuration of the Y direction movable structure 50, which has a similar configuration to the X direction movable structure 40, is described. As shown in FIG. 2, the Y direction movable structure 50 includes a movable plate 51, a static plate 52, a counter plate 53, a pair of connection plates 54 and 55, and a coupler 56.

The Y direction movable structure 50 differs from the X direction movable structure 40, in which the movable plate 41 is movable in the X-axis direction, in that the movable plate 51 is movable in the Y-axis direction. Therefore, the movable plate 51, the static plate 52, the counter plate 53, the pair of connection plates 54 and 55, and the coupler 56 of the Y direction movable structure 50 are similar in shape to the movable plate 41, the static plate 42, the counter plate 43, the pair of connection plates 44 and 45, and the coupler 46 of the X direction movable structure 40.

The movable plate 51 is positioned above the counter plate 43 of the X direction movable structure 40. The movable plate 51 is coupled to the static plate 42 via the coupler 46 of the X direction movable structure 40. The movable plate 51 is movable in the Y-axis direction when the external force is applied to displace the stylus 32 in the Y-axis direction.

The static plate 52 is arranged so as to overlap with the movable plate 51 from above and gaps of a predetermined size are provided between the static plate 52 and the movable plate 51 in the X-axis, Y-axis, and Z-axis directions. By providing the gaps, when the movable plate 51 is displaced in the Y-axis direction (movable direction), the movable plate 51 can be inhibited from contacting and rubbing against the static plate 52.

The counter plate 53 faces the movable plate 51 and the static plate 52 in a state separated from the movable plate 51 and the static plate 52. The connection plates 54 and 55 are arranged between the counter plate 53, and the movable plate 51 and the static plate 52, and the main surfaces of the connection plates 54 and 55 are positioned along the Z-axis direction. An opening 531a forming a rectangular through-hole is provided at the center side of the counter plate 53.

The pair of the connection plates 54 and 55 are arranged separated from each other in the Y-axis direction (movable direction of the movable plate 51). The connection plate 54 includes a center side connector 541 and an end side connector 542 having a similar configuration to the center side connector 441 and the end side connectors 442 of the connection plate 44 mentioned above. In addition, the connection plate 55 includes a center side connector 551 and an end side connector 552 having a similar configuration to the center side connector 451 and the end side connectors 452 of the connection plate 45.

The center side connector 541 of the connection plate 54 connects the static plate 52 and the counter plate 53, and the end side connector 542 connects the movable plate 51 and the counter plate 53. Further, the center side connector 551 of the connection plate 55 connects the movable plate 51 and the counter plate 53, and the end side connector 552 connects the static plate 52 and the counter plate 53. Therefore, by bending the end side connector 542 of the connection plate 54 and the center side connector 551 of the connection plate 55, the movable plate 51 is movable in the Y-axis direction.

The coupler 56 is a portion coupling the Y direction movable structure 50 (specifically, the static plate 52) and the Z direction movable structure 60 (specifically, a movable plate 61 described later). The coupler 56 is arranged in a space between the static plate 52 and the counter plate 53. Accordingly, the coupler 56 can be arranged effectively utilizing the dead space between the static plate 52 and the counter plate 53.

Detailed Configuration of Z Direction Movable Structure 60

With reference to FIGS. 2 to 4, the detailed configuration of the Z direction movable structure 60 is described. As shown in FIG. 2, the Z direction movable structure 60 includes the movable plate 61, a static plate 62, a counter plate 63, a pair of connection plates 64 and 65, and a coupler 66.

The Z direction movable structure 60 differs from the X direction movable structure 40, in which the movable plate 41 is movable in the X-axis direction, in that the movable plate 61 is movable in the Z-axis direction. Therefore, the configuration of the Z direction movable structure 60 is also substantially similar to the X direction movable structure 40.

The movable plate 61 is positioned above the counter plate 53 of the Y direction movable structure 50. The movable plate 61 is coupled to the static plate 52 via the coupler 56 of the Y direction movable structure 50. Specifically, an extension portion 67, which extends in the Y-axis direction, is provided to a side surface of the movable plate 61 and is coupled to the coupler 56. The movable plate 61 with the above configuration is movable in the Z-axis direction when the external force is applied to displace the stylus 32 in the Z-axis direction.

The static plate 62 is arranged so as to overlap with the movable plate 61 from above and gaps of a predetermined size are provided between the static plate 62 and the movable plate 61 in the X-axis, Y-axis, and Z-axis directions. By providing the gaps, when the movable plate 61 is displaced in the Z-axis direction (movable direction), the movable plate 61 can be inhibited from contacting and rubbing against the static plate 62.

The counter plate 63 faces the movable plate 61 and the static plate 62 in a state separated from the movable plate 61 and the static plate 62. The connection plates 64 and 65 are arranged between the counter plate 63, and the movable plate 61 and the static plate 62, and the main surfaces of the connection plates 64 and 65 are positioned along the Y-axis direction.

The pair of connection plates 64 and 65 are arranged separated from each other in the Z-axis direction (movable direction of the movable plate 61). The connection plate 64 includes a center side connector 641 and an end side connector 642 having a similar configuration to the center side connector 441 and the end side connectors 442 of the connection plate 44 mentioned above. In addition, the connection plate 65 includes a center side connector 651 and an end side connector 652 having a similar configuration to the center side connector 451 and the end side connectors 452 of the connection plate 45.

The end side connector 642 of the connection plate 64 connects the movable plate 61 and the counter plate 63, and the center side connector 641 connects the static plate 62 and the counter plate 63. In addition, the end side connector 652 of the connection plate 65 connects the static plate 62 and the counter plate 63, and the center side connector 651 connects the movable plate 61 and the counter plate 63. Therefore, by bending the end side connector 642 of the connection plate 64 and the center side connector 651 of the connection plate 65, the movable plate 61 is movable in the Z-axis direction.

The coupler 66 is a portion coupling the Z direction movable structure 60 (specifically, the static plate 62) and the housing 34 (specifically, the upper wall 34a). The coupler 66 extends toward the upper wall 34a of the housing 34 from a side surface of the static plate 62.

Effects in Present Embodiments

The above-mentioned probe 30 includes the X direction movable structure 40, the Y direction movable structure 50, and the Z direction movable structure 60, which each has similar configurations, and the stylus 32 is mounted to the movable plate 41 of the X direction movable structure 40. In addition, the first end extension portion 411 and the second end extension portions 412 and 413 positioned at both ends of the movable plate 41 in the X-axis direction are connected to the connection plates 44 and 45 at three places. The entire length of the first end extension portion 411 in the Y-axis direction is the same size as the entire length of the second end extension portions 412 and 413 in the Y-axis direction. The first end extension portion 411 and the second end extension portions 412 and 413 arranged at three places are connected to the connection plates 44 and 45, and the entire length of the first end extension portion 411 in the Y-axis direction is the same as the entire length of the second end extension portions 412 and 413 in the Y-axis direction. Therefore, the center of rotation of the movable plate 41 is positioned in the center of the movable plate 41. Then, the mounting position 414 of the stylus 32 and the center of rotation of the movable plate 41 are positioned close to each other, and therefore, even when the movable plate 41 rotates centered on the center of rotation after receiving the external force via the stylus 32, the stylus 32 is difficult to displace. As a result, measurement error due to the displacement of the stylus 32 can be prevented from occurring.

In the above, the X direction movable structure 40, the Y direction movable structure 50, and the Z direction movable structure 60 are stacked in order from the bottom, however, the present invention is not limited to this. For example, the Y direction movable structure 50 may be positioned at the lowest position. In such a case, the stylus 32 is mounted to the movable plate 51 of the Y direction movable structure 50.

Further, in the above, there are three connection places between the movable plate 41 and the connection plates 44 and 45, however, the number is not limited to this. For example, there may be four or more connection places between the movable plate 41 and the connection plates 44 and 45.

Furthermore, in the above, the second end extension portions 412 and 413 are positioned apart from the first end extension portion 411 when viewed from the mounting position 414, however, the present invention is not limited to this. For example, the second end extension portions 412 and 413, and the first end extension portion 411 may be arranged on a circumference centered on the mounting position 414 so as to be positioned at the same distance from the mounting position 414.

Second Embodiment

Figure 8:
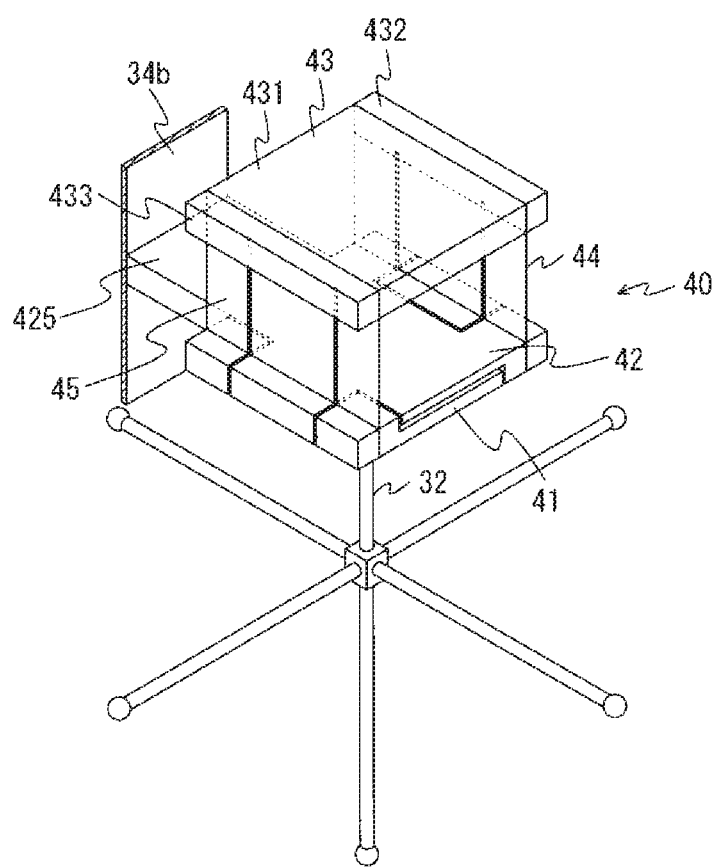
FIG. 8 is a perspective view illustrating a configuration of an X direction movable structure 40 according to a second embodiment.
Figure 8:
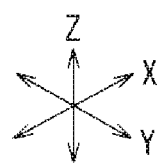
Figure 9:
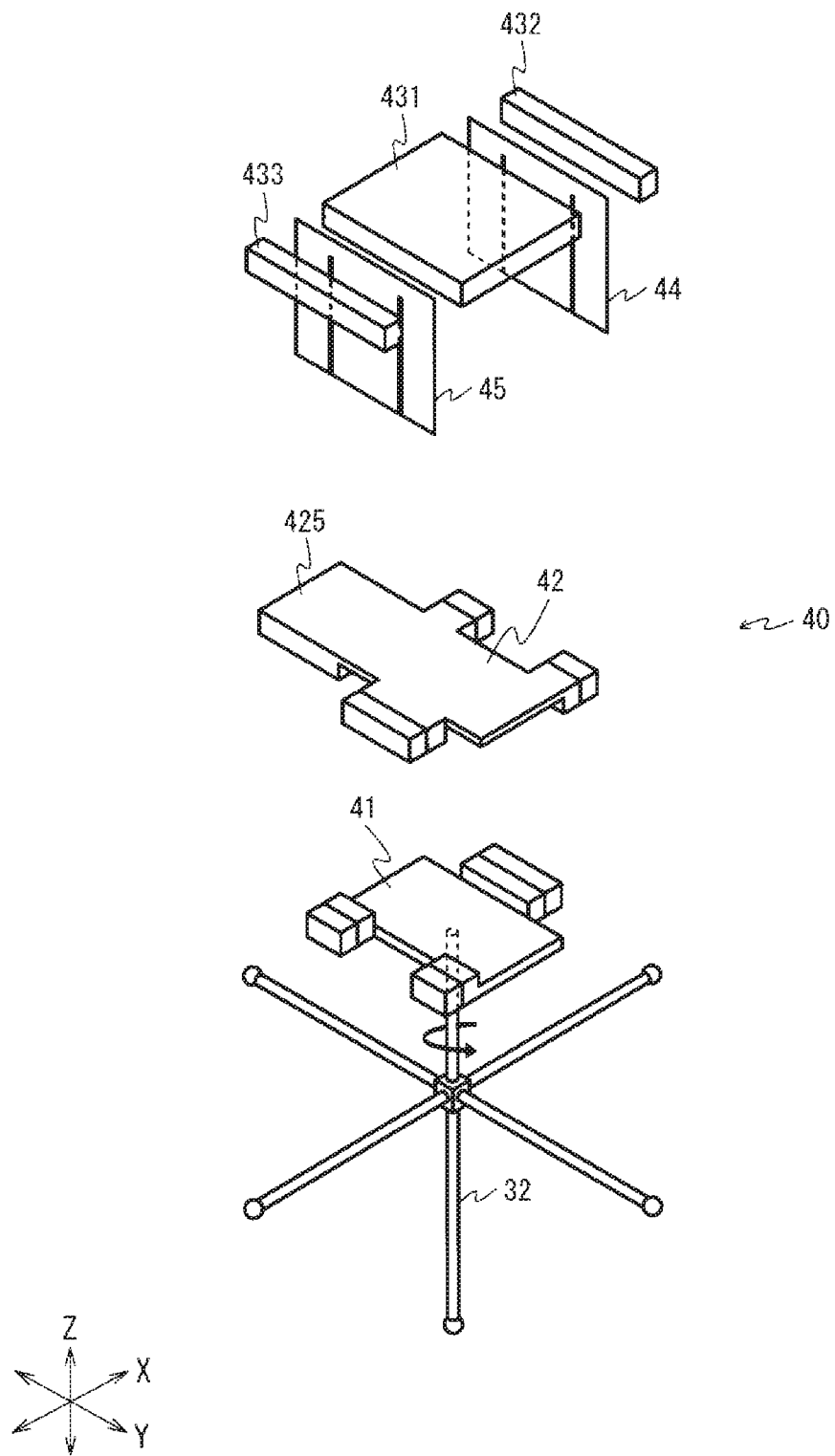
FIG. 9 is an exploded perspective view of the X direction movable structure 40 shown in FIG. 8.

With reference to FIGS. 8 and 9, a configuration of the probe 30 according to a second embodiment is described.

In the above-described first embodiment, the static plate 42 of the X direction movable structure 40 is coupled to the movable plate 51 of the Y direction movable structure 50 via the coupler 46 (FIG. 2) which is inserted through the opening 431a of the counter plate 43. In contrast, in the second embodiment, the coupler 46 and the opening 431a are not provided, and the static plate 42 of the X direction movable structure 40 is coupled to a side wall of the housing 34.

FIG. 8 is a perspective view illustrating the configuration of the X direction movable structure 40 according to the second embodiment. FIG. 9 is an exploded perspective view of the X direction movable structure 40 in FIG. 8. In the second embodiment, the static plate 42 includes an extension portion 425 extending along the Y-axis direction. The extension portion 425 is coupled to a side wall 34b of the housing 34.

The configurations of the movable plate 41 and the connection plates 44 and 45 of the X direction movable structure 40 according to the second embodiment are similar to the first embodiment. Therefore, as in the first embodiment, even when the torsional force is transmitted to the movable plate 41 from the stylus 32, the mounting position of the stylus 32 and the center of rotation of the movable plate 41 are positioned in the center of the movable plate 41. Thus, even when the movable plate 41 rotates, the stylus 32 is difficult to displace. As a result, measurement error due to the displacement of the stylus 32 can be prevented from occurring. Though not shown in FIG. 8, in the Y direction movable structure 50, the static plate 52 is coupled to the side wall 34b of the housing 34.

Third Embodiment

Figure 10:
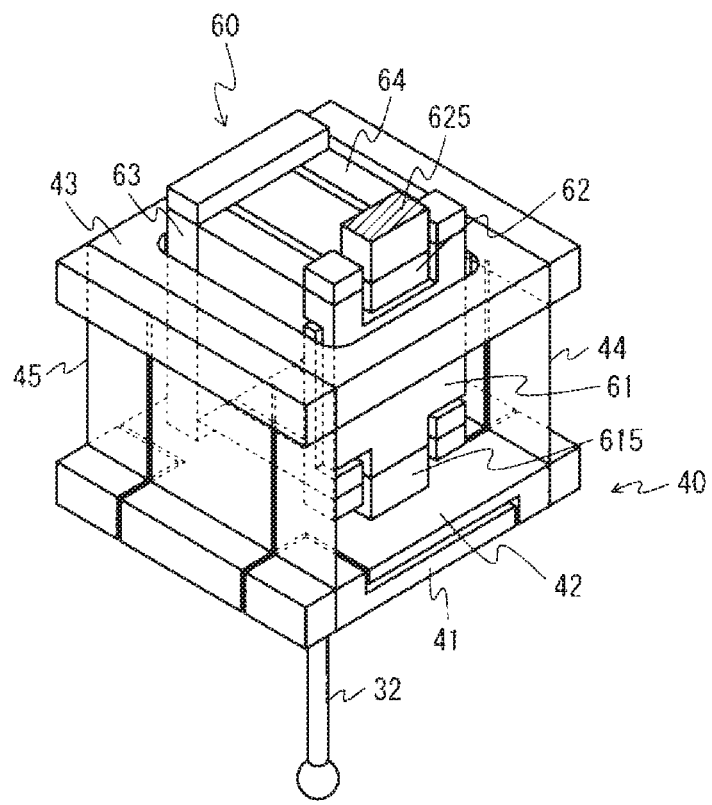
FIG. 10 is a perspective view illustrating a configuration of an X direction movable structure 40 and a Z direction movable structure 60 according to a third embodiment.
Figure 10:
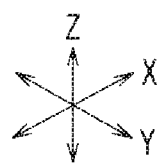
Figure 11:
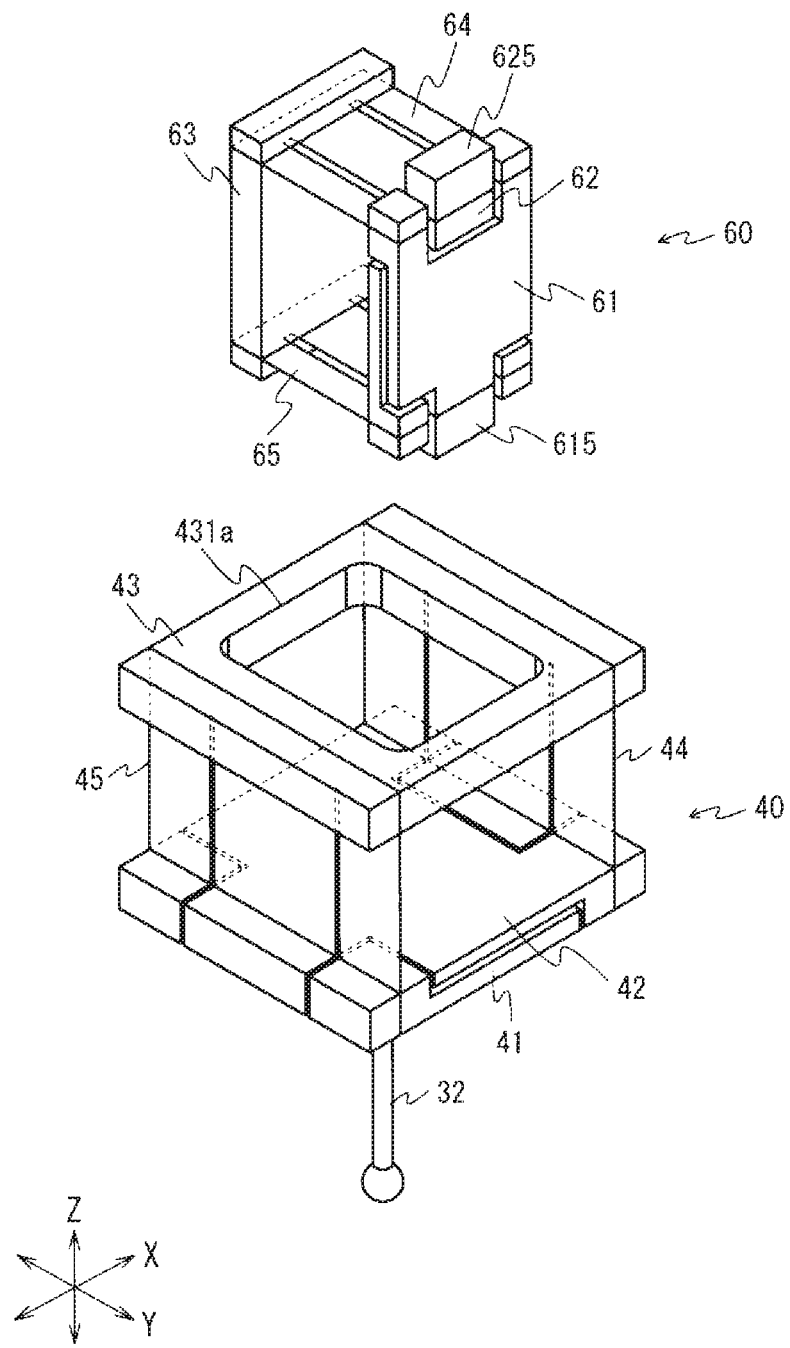
FIG. 11 is a perspective view illustrating a state where the X direction movable structure 40 and the Z direction movable structure 60 in FIG. 10 are separated from each other.

With reference to FIGS. 10 and 11, a configuration of the probe 30 according to a third embodiment is described.

FIG. 10 is a perspective view illustrating a configuration of the X direction movable structure 40 and the Z direction movable structure 60 according to the third embodiment. FIG. 11 is a perspective view illustrating a state where the X direction movable structure 40 and the Z direction movable structure 60 in FIG. 10 are separated from each other.

In the first embodiment, the Z direction movable structure 60 is provided separated from the X direction movable structure 40. In contrast, in the third embodiment, a majority portion of the Z direction movable structure 60 is configured so as to be arranged in a space inside the X direction movable structure 40.

In the third embodiment, the coupler 46 (FIG. 2) of the X direction movable structure 40 described in the first embodiment is not provided, and as shown in FIG. 10, the Z direction movable structure 60 is arranged in the space where the coupler 46 was provided. In other words, the movable plate 61, the static plate 62, the counter plate 63, and the connection plates 64 and 65 of the Z direction movable structure 60 are arranged between the static plate 42 and the counter plate 43 of the X direction movable structure 40. In order to arrange the Z direction movable structure 60 in the space of the X direction movable structure 40, the opening 431a of the counter plate 43 of the X direction movable structure 40 is larger.

The configuration of the Z direction movable structure 60 has a similar configuration to the Z direction movable structure 60 shown in FIGS. 2 to 4. Therefore, in this example, the coupling structure of the Z direction movable structure 60 and the X direction movable structure 40 is described.

The movable plate 61 of the Z direction movable structure 60 is coupled to the static plate 42 of the X direction movable structure 40. In the movable plate 61, a movable side extension portion 615 extending along the Z-axis direction is provided. The movable side extension portion 615 is coupled to the static plate 42 of the X direction movable structure 40.

The static plate 62 of the Z direction movable structure 60 is coupled to the Y direction movable structure 50 (see FIG. 2) which is not shown in FIG. 10. A static side extension portion 625 extending along the Z-axis direction is provided to the static plate 62. The static side extension portion 625 is coupled to the movable plate 51 of the Y direction movable structure 50.

In the third embodiment, by arranging the Z direction movable structure 60 in the dead space of the X direction movable structure 40, the length of the probe 30 in the Z-axis direction can be smaller. As a result, the probe 30 can be made smaller.

Embodiments of the present invention are described above, but the technical scope of the present invention is not limited to the scope of the embodiments described above. It is obvious that a person skilled in the art can make a great variety of modifications or improvements to the above-mentioned embodiments. It is clear from the description of the scope of claims that such modified and improved embodiments can be included in the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measurement probe performing measurement by contacting a measurable object, the measurement probe comprising:
   a movable plate to which is mounted a stylus capable of contacting the measurable object, the movable plate being displaceable in a first direction;
   a static plate arranged to overlap with the movable plate;
   a counter plate facing the movable plate and the static plate;
   a movable side connection plate having elasticity, the movable side connection plate connecting the counter plate at at least three places with each of a first end connector positioned toward a first end of the movable plate in the first direction and a second end connector positioned toward a second end in the first direction; and
   a static side connection plate which connects the static plate and the counter plate,
   wherein, an entire length of the first end connector in a second direction orthogonal to the first direction is the same size as an entire length of the second end connector in the second direction.

2. The measurement probe according to claim 1, wherein a shape of the first end of the movable plate in the first direction and the shape of the second end of the movable plate in the first direction are asymmetrical to each other.

3. The measurement probe according to claim 2, wherein a distance of the second end connector from a mounting position where the stylus is mounted is larger than the distance of the first end connector from the mounting position.

4. The measurement probe according to claim 1, wherein the movable side connection plate and the static side connection plate are formed by a single plate member in which a portion of the counter plate side of the movable side connection plate and a portion of the counter plate side of the static side connection plate are connected.

5. The measurement probe according to claim 1, wherein the movable plate, the static plate, the counter plate, the movable side connection plate, and the static side connection plate correspond to a first movable plate, a first static plate, a first counter plate, a first movable side connection plate, and a first static side connection plate respectively, the measurement probe further comprising:
    a second movable plate coupled to the first static plate via a coupler and is displaceable in the second direction orthogonal to the first direction;
    a second static plate arranged to overlap with the second movable plate;
    a second counter plate facing the second movable plate and the second static plate;
    an elastic second movable side connection plate, the second movable side connection plate connecting the second counter plate at at least three places with each of a first end connector positioned toward a first end of the second movable plate in the second direction and a second end connector positioned toward a second end in the second direction; and
    a second static side connection plate connecting the second static plate and the second counter plate,
    wherein the entire length of the first end connector of the second movable side connection plate in the first direction is the same size as the entire length of the second end connector of the second movable side connection plate in the first direction.

6. The measurement probe according to claim 5 wherein:
    the second movable plate is positioned above the first counter plate, and
    the first counter plate includes a through-hole through which the columnar coupler passes.

7. The measurement probe according to claim 5, wherein the second movable plate, the second static plate, the second counter plate, the second movable side connection plate, and the second static side connection plate are positioned in a space between the first static plate and the first counter plate.

8. The measurement probe according to claim 7 wherein the coupler extends in the second direction from the second movable plate.

9. A measuring device comprising:
    a measurement probe that performs a measurement by contacting a measurable object; and
    a mount to which the measurement probe is mounted, the measurement probe comprising:
        a movable plate to which is mounted a stylus capable of contacting the measurable object, the movable plate being displaceable in a first direction;
        a static plate arranged to overlap with the movable plate;
        a counter plate facing the movable plate and the static plate;
        a movable side connection plate having elasticity, the movable side connection plate connecting the counter plate at at least three places with each of a first end connector positioned toward a first end of the movable plate in the first direction and a second end connector positioned toward a second end in the first direction; and
        a static side connection plate connecting the static plate and the counter plate, wherein an entire length of the first end connector in a second direction which is orthogonal to the first direction is the same size as the entire length of the second end connector in the second direction.

* * * * *